United States Patent [19]
Delcourt et al.

[11] Patent Number: 6,052,527
[45] Date of Patent: *Apr. 18, 2000

[54] METHOD OF GENERATING PLATFORM-INDEPENDENT SOFTWARE APPLICATION PROGRAMS

[75] Inventors: Christine Delcourt, Crespieres; Claire Diehl-Watrin, Paris; Jean-Robert Huon, St-Michel S/Orge; Philippe Richard, Le Chesnay, all of France

[73] Assignee: Alcatel, Paris, France

[ * ] Notice: This patent issued on a continued prosecution application filed under 37 CFR 1.53(d), and is subject to the twenty year patent term provisions of 35 U.S.C. 154(a)(2).

[21] Appl. No.: 09/021,420

[22] Filed: Feb. 10, 1998

[30] Foreign Application Priority Data

Feb. 21, 1997 [FR] France ................ 97 440017

[51] Int. Cl.$^7$ ................ G06F 9/45

[52] U.S. Cl. ................ 395/705; 395/703

[58] Field of Search ................ 395/705, 708, 395/650, 500

[56] References Cited

U.S. PATENT DOCUMENTS

| | | | |
|---|---|---|---|
| 5,457,797 | 10/1995 | Butterworth et al. | 709/302 |
| 5,488,714 | 1/1996 | Skidmore | 395/707 |
| 5,500,881 | 3/1996 | Levin et al. | 395/703 |
| 5,583,983 | 12/1996 | Schmitter | 395/705 |
| 5,590,331 | 12/1996 | Lewis et al. | 395/708 |
| 5,724,508 | 3/1998 | Harple, Jr. et al. | 395/205 |
| 5,860,072 | 1/1999 | Schofield | 707/101 |

FOREIGN PATENT DOCUMENTS

| | | |
|---|---|---|
| 0540487 | 5/1993 | European Pat. Off. . |
| 0726517 | 8/1996 | European Pat. Off. . |

OTHER PUBLICATIONS

"Schematic Pseudocode for Program Constructs and its Computer Automation by Schemacode", P. Robillard, *Communications of the ACM*, Nov. 1986, vol. 29, No. 11, pp. 1072–1089.

Rational Software Corporation, 'Unified Modeling Language, UML Booch & OMT Quick Reference for Rational Rose 4.0', Santa Clara, CA, Jan. 1997.

Rational Software Corporation, 'Rational Rose, Using Rational Rose 4.0', Santa Clara, CA., Chapter 11, Nov. 1996.

Rumbaugh, J.; Blaha, M.; Premerlani, W.; Eddy, F.; Lorensen, W.; Object–Oriented Modeling and Design. Englewood Cliffs, NJ. Chapter 2, Nov. 1990.

Ross, Michael, "Portability by Design", Dr. Dobb's Journal on CD–ROM, pp. 1–12, Mar. 1994.

*Primary Examiner*—Tariq R. Hafiz
*Assistant Examiner*—Kelvin E. Booker

[57] ABSTRACT

The invention concerns the generation of a software application that can be applied to several different target platforms. A software application is described by two separated, platform independent descriptions of said application, a computational description (CD) describing the structure and semantic of said application in a platform independent way and an engineering description (ED) describing the implementation principles of said application in a platform independent way. Both of said two separated descriptions (CD, ED) are used to map the application onto a target platform (TP) by means of a respective target platform profile.

11 Claims, 3 Drawing Sheets

METHOD OF GENERATING PLATFORM-INDEPENDENT SOFTWARE APPLICATION PROGRAMS

BACKGROUND OF THE INVENTION

1. Technical Field

This invention concerns a method for generating a software application that can be applied to several different target platforms, a device for generating a software application that can be applied to several different target platforms, a program module containing a software application and a data processing unit controlled by a software application.

2. Discussion of Related Art

Normally, application software is generated and encoded closely related to the respective target platform, on top of which this application will later be executed. The programmer has to take into account the application programming interface (API) of the target platform and he has to choose the platform dependent means and functional principles to implement the execution principles of his application. He has therefore for example to consider the mechanisms of the operating systems (UNIX, Windows NT, . . . ) of the target platform.

This approach has the disadvantage, that the description of the application produced by the programmer is dependent on the respective platform and can therefore not be automatically transformed to another target platform. If the application has to be executed on another platform, a totally new description of the application has to be encoded by the programmer.

Another drawback of this approach is, that the programmer requires knowledge of the platform specifics, which he cannot reuse when he has to encode programs for other target platforms.

Further, there already exist some standards and products (OMG/CORBA, . . . ) that allow an object oriented, platform independent design of application software. These standards and tools are mainly used for generating software applications that are of higher complexity, which is for example the case in the telecommunication field. In such a object oriented design description of an application the functions of the application are described by a plurality of interaction objects. If the application is implemented with a CORBA product (CORBA =Common Object Request Broker Architecture), the specification of the interaction between objects is done by means of the IDLO language. This description is translated to source code written in a programming language, which provides distribution transparency at the programming level.

SUMMARY OF INVENTION

But other platform implementation aspects have still to be managed by the programmer. Therefore, the drawbacks mentioned for the above approach still exist.

Accordingly, it is a primary objective of the present invention to decouple an application from the but underlying target platform not only at the design level, also at the programming level.

According to a first aspect of the invention, a method for generating a software application applicable to several different target platforms comprises the steps generating and storing two separate, platform independent of descriptions of said application, a computational description describing a structure and semantic of said application in a platform independent way and an engineering description describing implementation principles of said application in a platform independent way and using of both of said two separated descriptions for mapping the application onto one of said several target platforms (TP) by means of a respective target platform profile. Mapping comprises transforming the form of representation of the application into other forms which are executable on the respective target platforms.

According to a second aspect of the invention, a device for generating a software application applicable to several different target platforms comprises first inputting means for inputting a computational description describing a structure and semantic of said application in a platform independent way, second inputting means for inputting an engineering description describing implementation principles of said application in a platform independent way, memory means for storing said computational description and said engineering description as two separated, platform independent descriptions of said application, and generating means for generating by means of both of said two separated descriptions and of a target platform profile an executive support that maps the application onto a respective one of said several target platforms.

According to a third aspect of the invention, a program module implementing a software application comprises two separate, platform independent descriptions of said application, a computational description describing the structure and semantic of said application in a platform independent way and an engineering description describing the implementation principles of said application in a platform independent way, and containing mapping means for mapping the application described by said two separate descriptions onto a target platform.

According to a fourth aspect of the invention, a data processing unit controlled by a software application comprises two separated, platform independent descriptions of said application, a computational description describing structure and semantic of said application in a platform independent way and an engineering description describing implementation principles of said application in a platform independent way, and containing mapping means for mapping the application described by said two separated descriptions onto a target platform.

The underlying idea forming the basis of this invention, is to separate the "what has to be done" from the "how it has to be done" and to describe these two things in a platform independent way in two separated descriptions, a computational description and an engineering description. These two descriptions are then used to map the application onto the respective target platform.

This new approach has following advantages:
  It ensures the portability of application architecture and of the application code.
  The programmer does not have to be concerned about the Applications Programming Interface (API) of the target platform.
  It is possible to reconfigure an application without changing the application code. By separation of the configuration aspects, which are part of the engineering description, from the objects and interfaces descriptions and code, which are part of the computational description, flexibility is gained and one is able to change the configuration without having to change the objects and interface descriptions and code.
  Therefore, by using this new approach, the development and evolution costs of an application and time to market of an application are reduced.

It's especially advantageous to integrate characteristics into the computational and in the engineering description to ensure a good mapping and the use of the most adapted mechanisms of the target platform and to answer the needs set by the technological field of the application, for example to answer telecommunication application needs.

The characteristics added in both separate descriptions have an implementation on the target platform. The characteristics in the descriptions that require the knowledge of the platform for the mapping and execution are taken into account by generation tools and an executive support. This executive support takes care of ensuring satisfaction of the characteristics and the user does not need to know the platform specifics.

BRIEF DESCRIPTION OF THE DRAWING

The present invention will now be described with reference to the accompanying drawings, wherein.

DETAILED DESCRIPTION OF PREFERRED EMBODIMENTS

Figure 1:
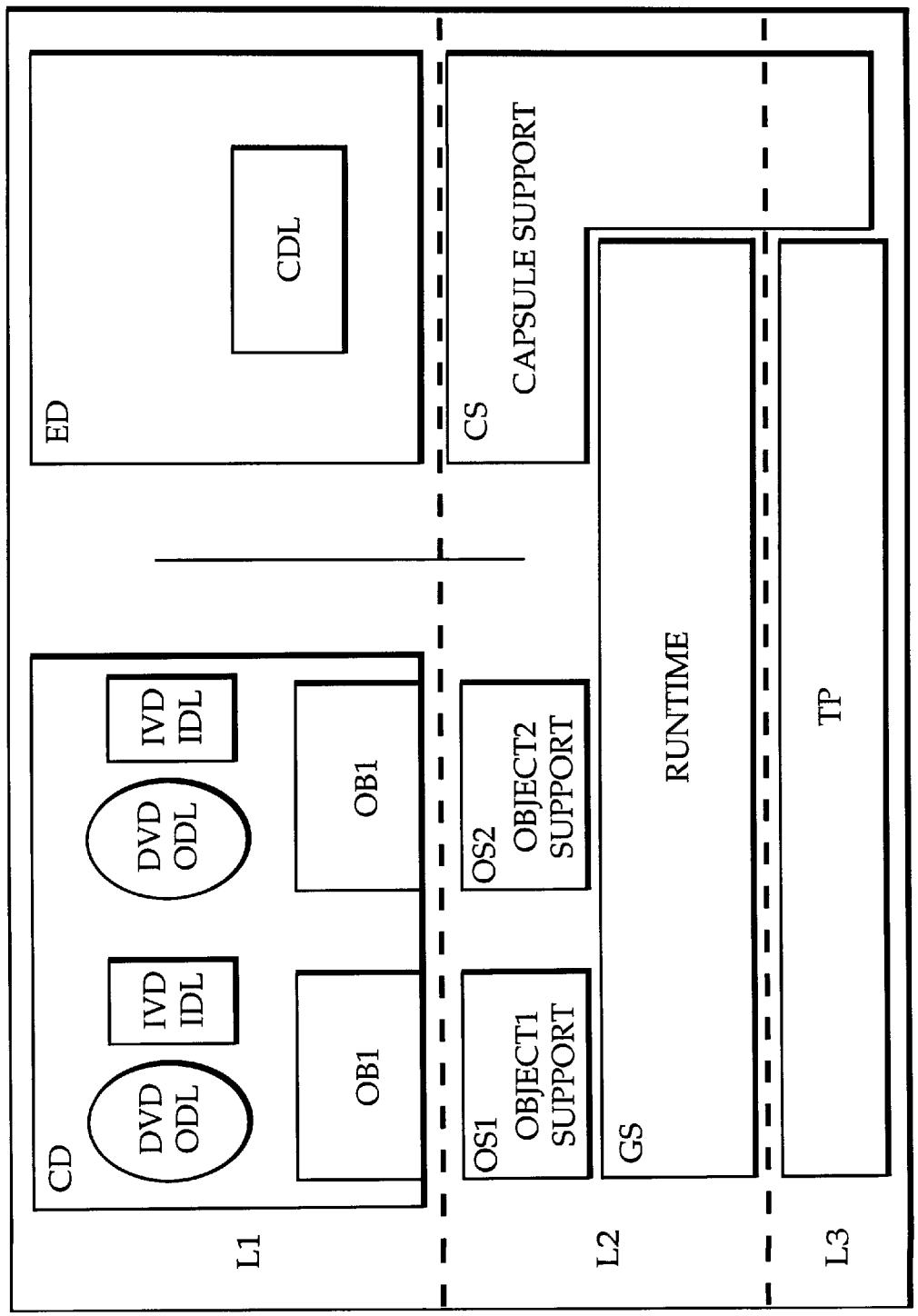
FIG. 1 is a block diagram presenting the architecture of a program module according to the invention.

FIG. 1 shows a software architecture model with an application level L1, a support level L2 and a platform level L3.

The application level L1 contains two different, separated descriptions, a computational description CD and an engineering description (ED). With both these descriptions the application is described in a platform independent way.

The platform level contains a target platform TP. This target platform has a platform specific application programming interface (API). The support level L2 maps the application described by the computational description CD and the engineering description ED on the target platform TP. The support level L2 hides the target platform-specific application program and manages its resources, like distribution, communication, threads.

It is possible that the this mapping is supported by tools associated with the support level L2.

Therefore, a program module implementing an application has the following architecture:

The program module contains the computational description CD and the engineering description ED, that describe the application in a platform independent way. Further it contains software modules of the support level, that provide the mapping of these two descriptions onto the target platform TP. If the application should be transformed to another target platform, only these software modules have to be changed.

In a preferred embodiment of the invention these software modules of the support level are generated from the two descriptions ED and CD and from a respective target platform profile. This is an efficient way to generate a well-adapted support level L2.

In the following an embodiment of the invention is described in more detail:

The computational description CD holds the abstract representations necessary to describe the structure and the semantics of an application in terms that are not directly bound to a particular technology.

In a preferable embodiment the descriptions CD and ED are based on an object model. An object model embodies the ideas of modularity and data encapsulation that are useful for structuring and reusability purposes.

For creating the computational description CD, the object has to be abstracted from the direct platform issues. A collection of object classes and the relation between them has to be described. As examples for the objects described in the computational description, two objects OB1 and OB2 are shown in FIG. 1.

Objects are described platform-independently in two different descriptive ways: An interaction view description IVD and a design view description DVD.

The interaction view description IVD describes the interface of an object with the rest of the application, that is what service it offers to the rest of the application. The interaction view description IVD of an object interface contains:

the definition of supporting types for defining operations the signature of each operation that can be invoked by clients of an interface of that type.

The interaction view description (IVD) follows the RPC model (RPC=Remote Procedure Call). The type of interactions is part of the specification of each operation. Two basic types of interactions are supported: interrogation or notification. If more application requirements have to be taken into account, additional interaction types can be introduced.

As language for describing the object interaction view description IVD a language IDL is used. This language IDL is for example the CORBA/IDL language or a subset of the CORBA/IDL language.

The design view description DVD defines the internal layout of the object, that is, the information that guides both the implementors of the functional encoding and the support software for the support level L2.

In the design view description DVD the focus is on the object definition and on its internal structure. This includes the interface that the object provides to the outside world.

In this description, it's advantageous to assign to an object class one or more non-functional characteristics or properties that are relevant to its implementation. Such characteristics can be:

interfaces from other objects that are used, supported interfaces, administrative interfaces to manage the object life-cycle execution profile including concurrence and behavioral characteristics (a execution profile is a predefined model of execution whose properties are well known), quality of service constraints data persistency.

If the description of such non-functional and quality of service properties is sufficiently detailed and accurate, the choice of an execution profile can be automated. Having only a limited set of execution profiles allows one to master the complexity of the platform programming and to ensure the efficiency of the object implementation.

As language for describing the design view description DVD an Object Definition Language (ODL) is used. As language ODL an expanded version of the existing language ODL/CORBA (ODL=Object Description Language) can be used, that contains additional syntax for assigning the above mentioned characteristics.

To finish the description of an object class, the programmer has to code or describe the operations of the object class.

This is preferably done after the design view description D1 and the interaction view description D2 are fully described. By doing this, the computational description (CD) for the objects OB1 and OB2 is finished.

The characteristics of an object class are ensured by the support level L2. Therefore, the programmer does not have to take them into account. He does not, for example have to care about thread management. He can concentrate on the interactions with the other objects (instance creation, operation invocation and such interactions include instance destruction).

The engineering description ED addresses the describing of the implementation principles of the application. This information is necessary in order to carry out the concretization of the computational abstract representations that have to be initiated on the target platform.

Whereas the computational description CD focuses on individual object design issues, the engineering description ED addresses architectural issues and in particular "how" the "what" will be done. The application is now viewed as a collection of object instances. The engineering description describes for example issues of placement (what will be local, what will be remoted) or grouping of service instances into units of execution resource allocation (that will be later mapped to platform concepts such as processes).

Following are main concepts used for describing the engineering description:

A capsule is an abstraction of a resource provision unit. Object instances are grouped into capsules. Characteristics are assigned to a capsule that describe its behavior. These characteristics are for example the assignment of engineering threads and queues.

A node represents the entity that actually provides physical execution resources, it refers to a single computer or station.

Recovery: in case the application is not able to pursue its computation because there is for example a system or an applicative problem, parameters are assigned that initiate the recovery of a part of it. The smallest unit of recovery is a capsule.

An object instance can be statically or dynamically created activated deactivated and destroyed through a factory service.

Figure 2:
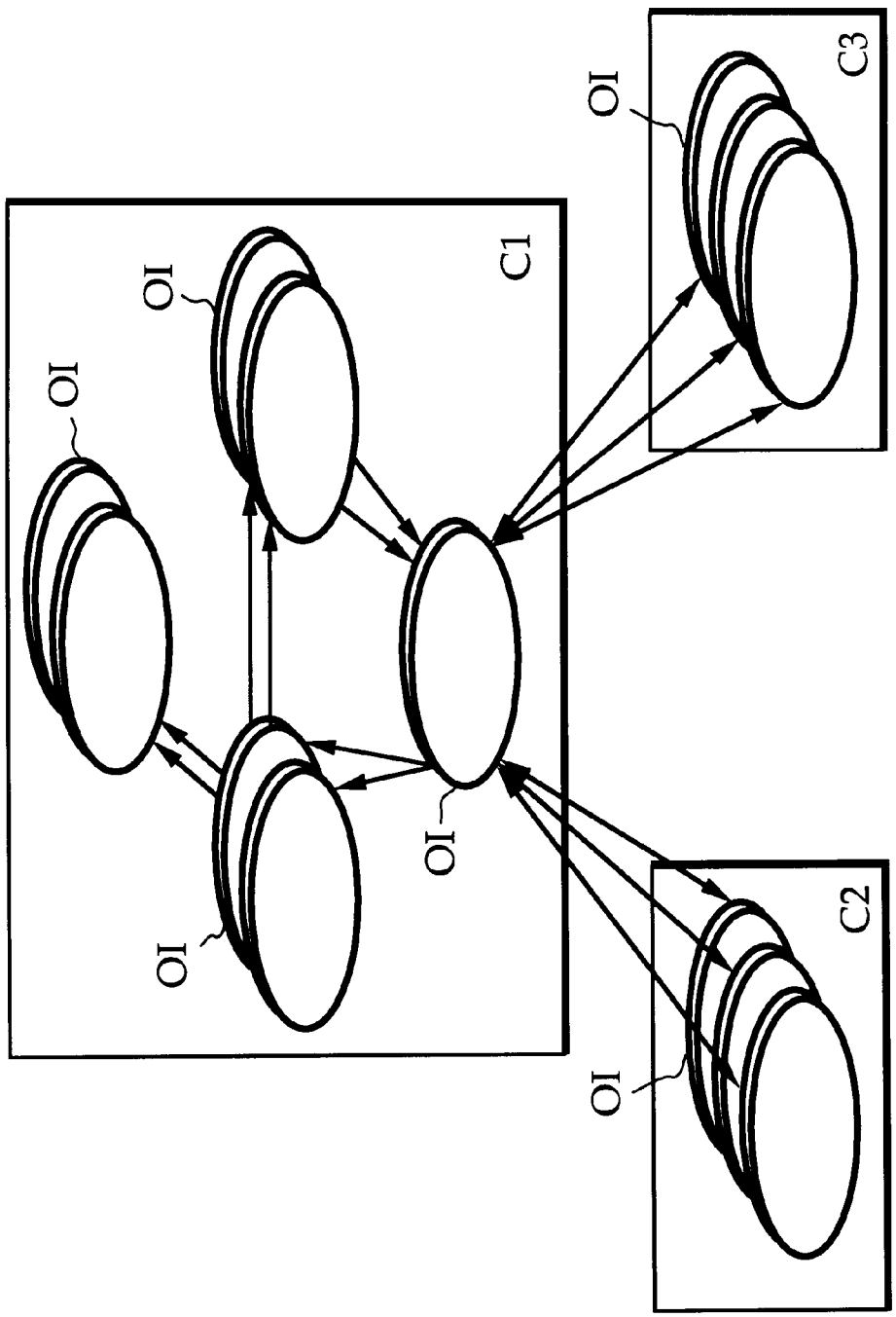
FIG. 2 is an illustration presenting a part of an engineering description.

FIG. 2 shows an example of a part of such an engineering description. It shows 3 capsules C1 to C3, containing object instances OI. The object instances OI are distributed into the capsules C1 to C3 and each of the capsules C1 to C3 are dimensioned according to the implementation principles of the application.

The capsule C1 is assigned to the handling of a call. It contains several different interaction object instances directed to signaling, charging, call managing and connection (CNX) managing. The capsules C2 and C3 contain several subscriber object instances.

Further, according to implementation principles of the application, the above mentioned characteristics and parameters are assigned to the capsules C1 to C3 and an assignment is specified that maps the capsules C1 to C3 into the available nodes.

The engineering description ED is described by means of a configuration description language CDL.

The applicative objects that have been described by the computational description CD are mapped onto the target platform TP. Both descriptions, the computational description CD and the engineering description ED are used to choose the most suitable mechanisms of the target platform. There is not only an intermediate layer, the support layer L2, put on top of the platform, but this intermediate layer is generated from the two descriptions CD, ED in such a way, that the best advantage is taken regarding its regarding application characteristics. The use of platform functionality and inner mechanisms of the platform are completely controlled by the support level L2.

Advantageously, the translation from the computational description CD and the engineering description ED to the platform programming interface of the target platform TP is done at software production time and not at runtime. This is done by using a respective target platform profile well suited to the target platform TP.

Because of the complete description of the semantics, structure and implementation principles, mapping rules can be precisely defined for every target platform and can be stored in a target platform profile.

The support level comprises a Generic runtime Support (GS) module, a plurality of object support modules OS1 and OS2 and a capsule support module CS.

The object support modules OS1 and OS2 and the capsule support module CS make the link between the two descriptions of ED and CD and the generic runtime GS.

The object support modules OS1 and OS2 are generated from the computational description CD. The support modules OS1 and OS2 take care, that the characteristics of the object class are respected and implemented on the target platform TP.

The capsule support module (CS) is generated from the engineering description (ED). It takes care of the implementation principles and performs the mapping of these implementation principles onto platform concepts like processes and software components and generate automatically the respective services.

The generic runtime support (GS) is independent from the application. It includes operations like communication, and thread management. It uses specifics of the target platform to manage the distribution, the platform resources, the communications between object instances, recovery, and related operations.

The runtime GS implements the execution profiles specified in the design description of the objects. It includes the instance concurrence control, the thread management inside a capsule and the choice of internal communication mechanisms. Further, the runtime support GS performs the interfaces with the platform, the management of the instances life-cycle, the management of the data persistency and of the recovery of active instances in case of crash failure.

Figure 3:
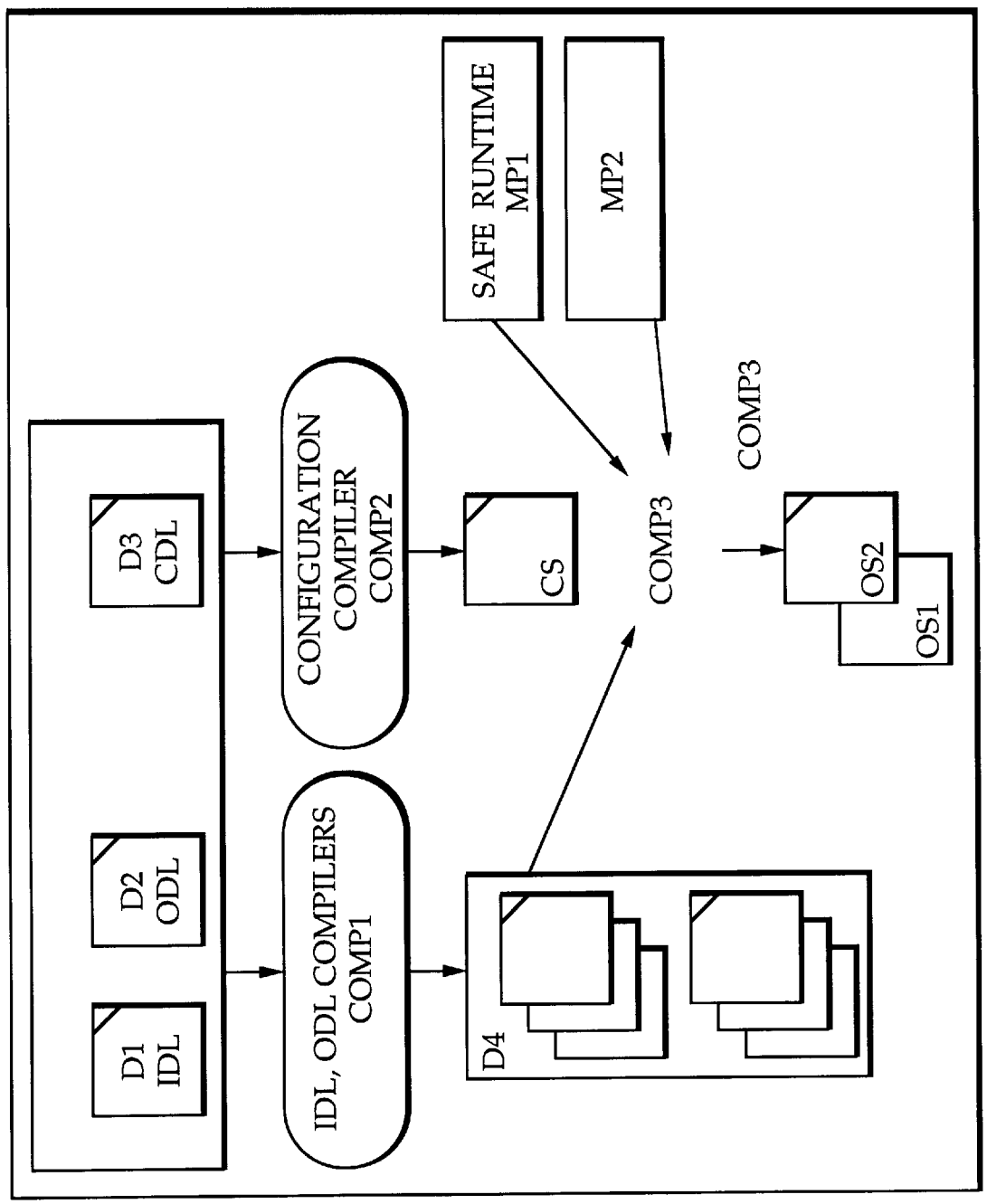
FIG. 3 is a flowchart presenting the processing of a method for generation of a software application according to the invention.

The generation of a platform independent application is now demonstrated according to FIG. 3.

FIG. 3 shows four application description steps D1 to D4, three compilation steps COMP1 to COMP3, the support modules CS, OS1 and OS2 and two mapping profiles MP1 and MP2.

In the description steps D1 and D2 the design view description DVD and interaction view description IVD of the objects of the application are inputted and stored.

In the description step D3 the engineering description ED is inputted and stored.

The stored design view description (DVD) and interaction view description IVD of the objects of the application are translated, after performing consistency checks, in the compilation step COMP1 into a programming language. In the description step D4, a description of the operations of the objects is inputted. This description is written in said programming language and inserted in the position determined by the translated design view description DVD and interaction view description IVD of the objects. This detailed computational description CD is then stored.

In the compilation step COMP2, the engineering description ED is translated, after performing consistency checks, into the capsule support module CS that contains all material required to build up the application: source files, make files or equivalent.

In the compilation step COMP3, the computational description CD is translated into the support modules OS1 and OS2. This compilation steps takes into account the mapping profiles MP1 and MP2. The mapping profile MP1 is the runtime GS and the mapping profile MP2 comprises the target platform libraries.

We claim:

1. A method of generating a platform-independent software application applicable to a plurality of different target platforms, said method comprising the steps of:

generating a respective target platform profile for each of said target platforms (TP);

generating and storing two separate, platform-independent descriptions of said application, namely a computational description (CD) describing a structure and semantics of said application in a platform-independent way in terms of definitions of respective object types and interfaces among objects and operations which can be invoked by said respective object types, and an engineering description (ED) which specifies in a platform-independent way how to perform said application in terms of object instances grouped into capsules, which processor nodes are to execute respective operations, and recovery procedures in case execution fails to be completed, and using both of said two separate descriptions (CD, ED) for mapping the application onto one of said plurality of target platforms (TP) by means of said respective target platform profile.

2. The method according to claim 1, further comprising the steps of including non-functional characteristics in the computational description (CD) and using said characteristics for said mapping and for selection of appropriate mechanisms in said target platform (TP) for carrying out said application.

3. The method according to claim 1, further comprising the step of generating and storing a design view description (DVD) of a plurality of said interacting objects said description assigning to each interacting object at least one of said non-functional characteristics, describing behavior of respective interacting objects.

4. The method according to claim 2, further comprising the steps of generating and storing at least one characteristic in the engineering description (ED) and using said at least one characteristics for mapping and for selection among mechanisms available in said target platform (TP).

5. The method according to the claim 3, further comprising the step of generating and storing a description of grouping of instances of said interacting objects (OI) and a description of an assignment between a group of object instances (C1 to C3) and a specific group characteristic.

6. The method according to claim 1, further comprising the step of generating at least one executive support module (OS1, OS2, CS) based upon the computational description (CD) and the engineering description (ED), which executive support module controls execution of the application together with a generic runtime support module (GS).

7. The method according to claim 1, further comprising the step of generating a plurality of separate executive support modules, OS1, OS2; CS) based upon the computational description (CD) and the engineering description (ED), respectively, which executive support modules link the computational description (CD) and the engineering description (ED), respectively, with a generic runtime support module (GS).

8. The method according to the claim 6, further comprising the step of generating the executive support modules (OS1, OS2, CS) in such a way that the executive support modules (OS1, OS2, CS) select, by means of the generic runtime support (GS), proper mechanisms of the target platform (TP) for fulfilling characteristics of the application described in the computational description (CD) and in the engineering description (ED).

9. A device for generating a platform-independent software application applicable to several different target platforms, said device containing first inputting means for inputting a computational description (CD) describing a structure and semantics of said application in a platform-independent way, in terms of definitions of respective object types and interfaces among objects and operations which can be invoked by said respective object types, second inputting means for inputting an engineering description (ED) which specifies in a platform-independent way how to perform said application in terms of object instances grouped into capsules, which processor nodes are to execute respective operations, and recovery procedures in case execution fails to be completed, memory means for storing said computational description and said engineering description as two separate, platform-independent descriptions of said application, and generating means for generating, by means of both of said two separate descriptions (CD, ED) and of a target platform profile, an executive support module (OS1, OS2, CS, GS) that maps the application onto application onto a respective one of said several target platforms (TP).

10. A program module implementing a software application, said program module containing two separate, platform-independent descriptions of said application, namely a computational description (CD) describing a structure and semantics of said application in a platform-independent way, in terms of definitions of respective object types and interfaces among objects and operations which can be invoked by said respective object types, and an engineering description (ED) which specifies in a platform-independent way how to perform said application in terms of object instances grouped into capsules, which processor nodes are to execute respective operations, and recovery procedures in case execution fails to be completed, and containing mapping means (OS1, OS2, CS, GS) for mapping the application described by said two separate descriptions (CD, ED) onto a target platform (TP).

11. A data processing unit controlled by a software application, said data processing unit comprising two separate, platform-independent descriptions of said application, namely a computational description (CD) describing a structure and semantic of said application in a platform-independent way, in terms of definitions of respective object types and interfaces among objects and operations which can be invoked by said respective object types, and an engineering description (ED) which specifies in a platform-independent way how to perform said application in terms of object instances grouped into capsules, which processor nodes are to execute respective operations, and recovery procedures in case execution fails to be completed, and containing mapping means (OS1, OS2, CS, GS) for mapping the application described by said two separate descriptions (CD, ED) onto a target platform (TP).

* * * * *

UNITED STATES PATENT AND TRADEMARK OFFICE
CERTIFICATE OF CORRECTION

PATENT NO : 6,052,527
DATED : April 18, 2000
INVENTOR(S) : Delcourt et al

It is certified that error appears in the above-identified patent and that said Letters Patent is hereby corrected as shown below:

At col. 7, line 55 (claim 4, line 5), please cancel "characteristics" and substitute --characteristic-- therefor.

At col. 8, line 7 (claim 7, line 4), please cancel the comma after "modules" and insert a --(-- prior to "OS1"; and at lines 44-45 (claim 9, lines 24-25), please cancel the second occurrence of "application onto".

Signed and Sealed this

Twenty-seventh Day of March, 2001

Attest:

NICHOLAS P. GODICI

Attesting Officer

Acting Director of the United States Patent and Trademark Office